G. W. JACKSON.
LOADING MACHINE.
APPLICATION FILED JULY 26, 1918.

1,313,695.

Patented Aug. 19, 1919.
4 SHEETS—SHEET 1.

Inventor
George W. Jackson
By William L. Hale,
Atty.

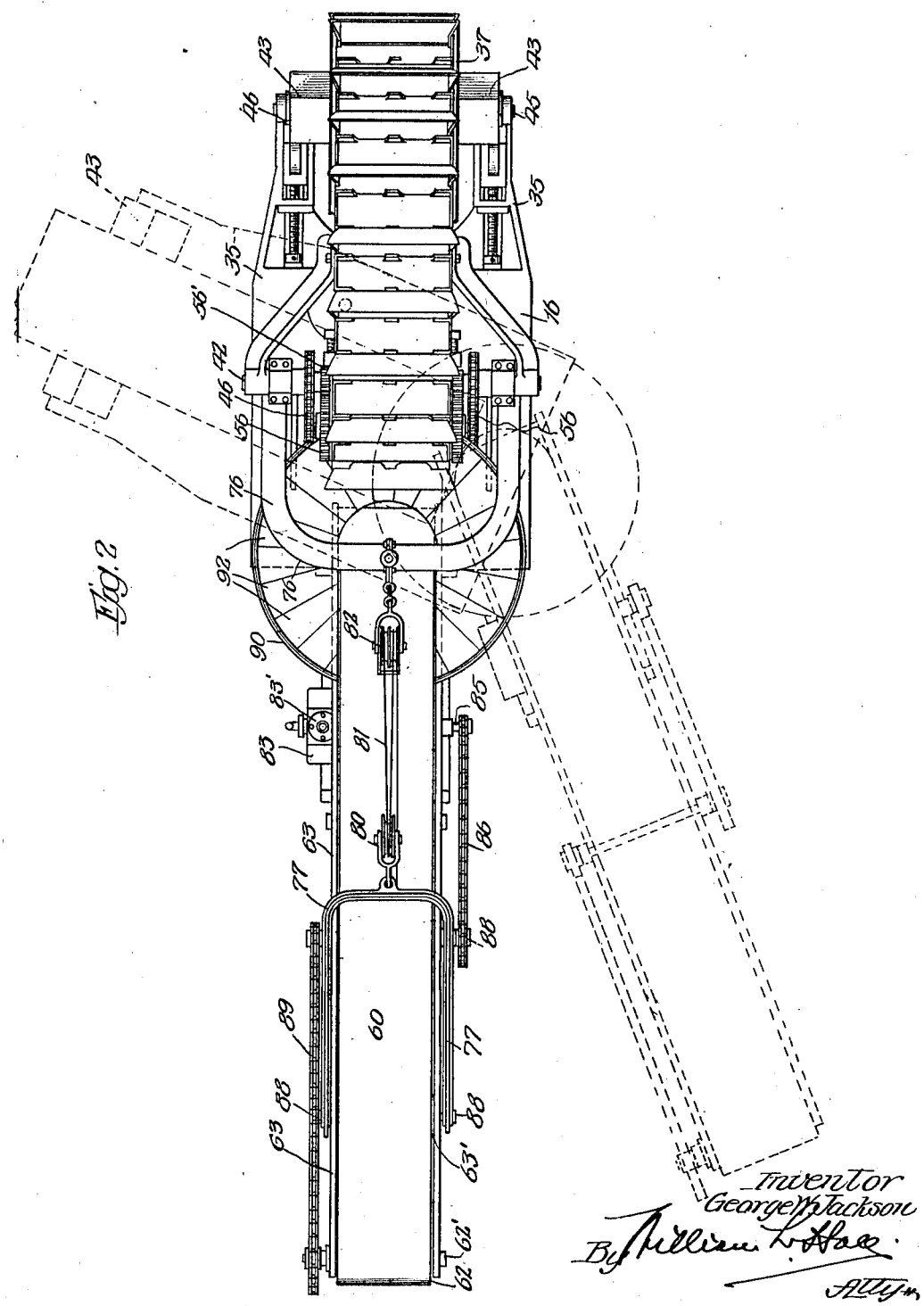

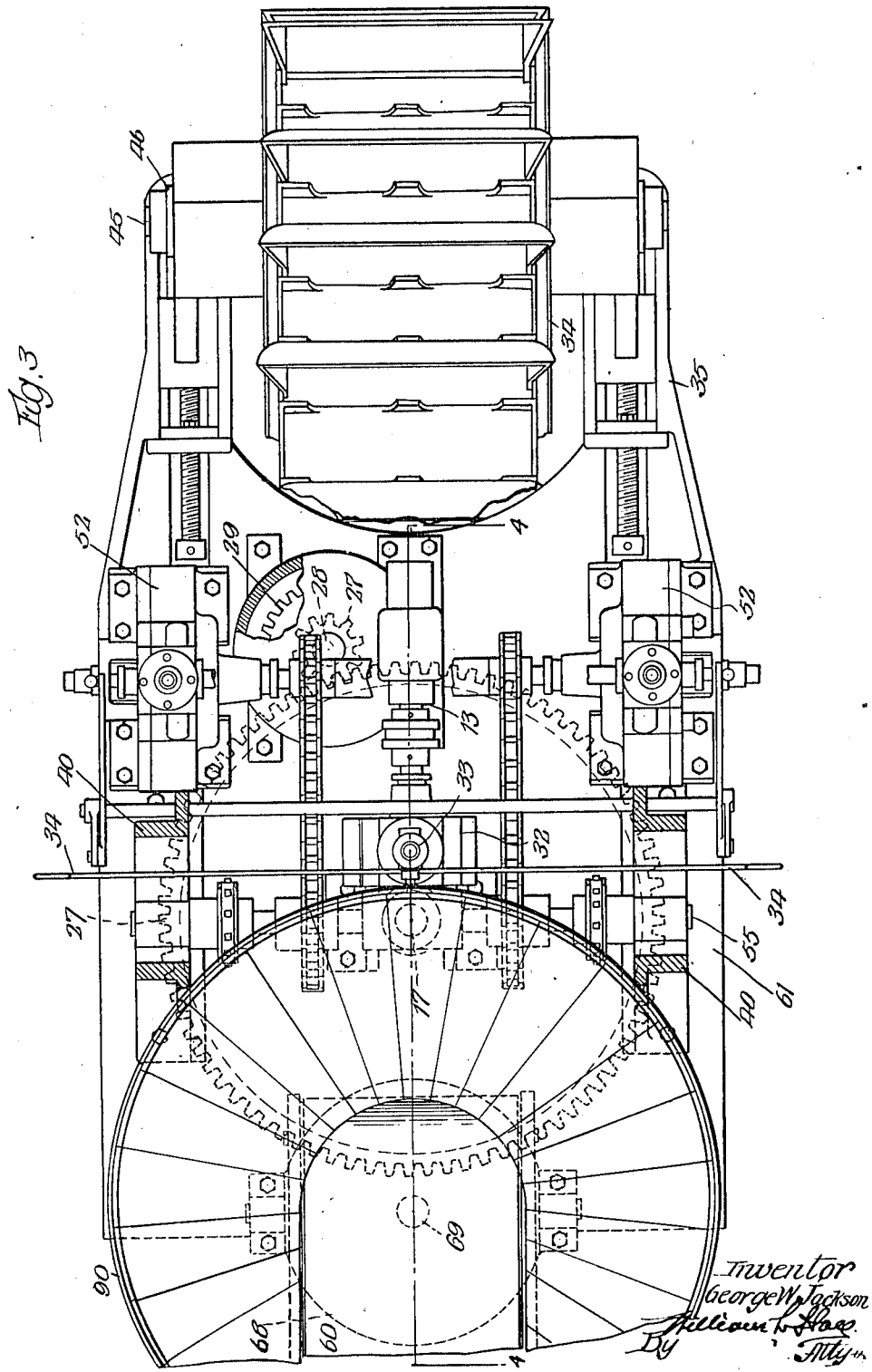

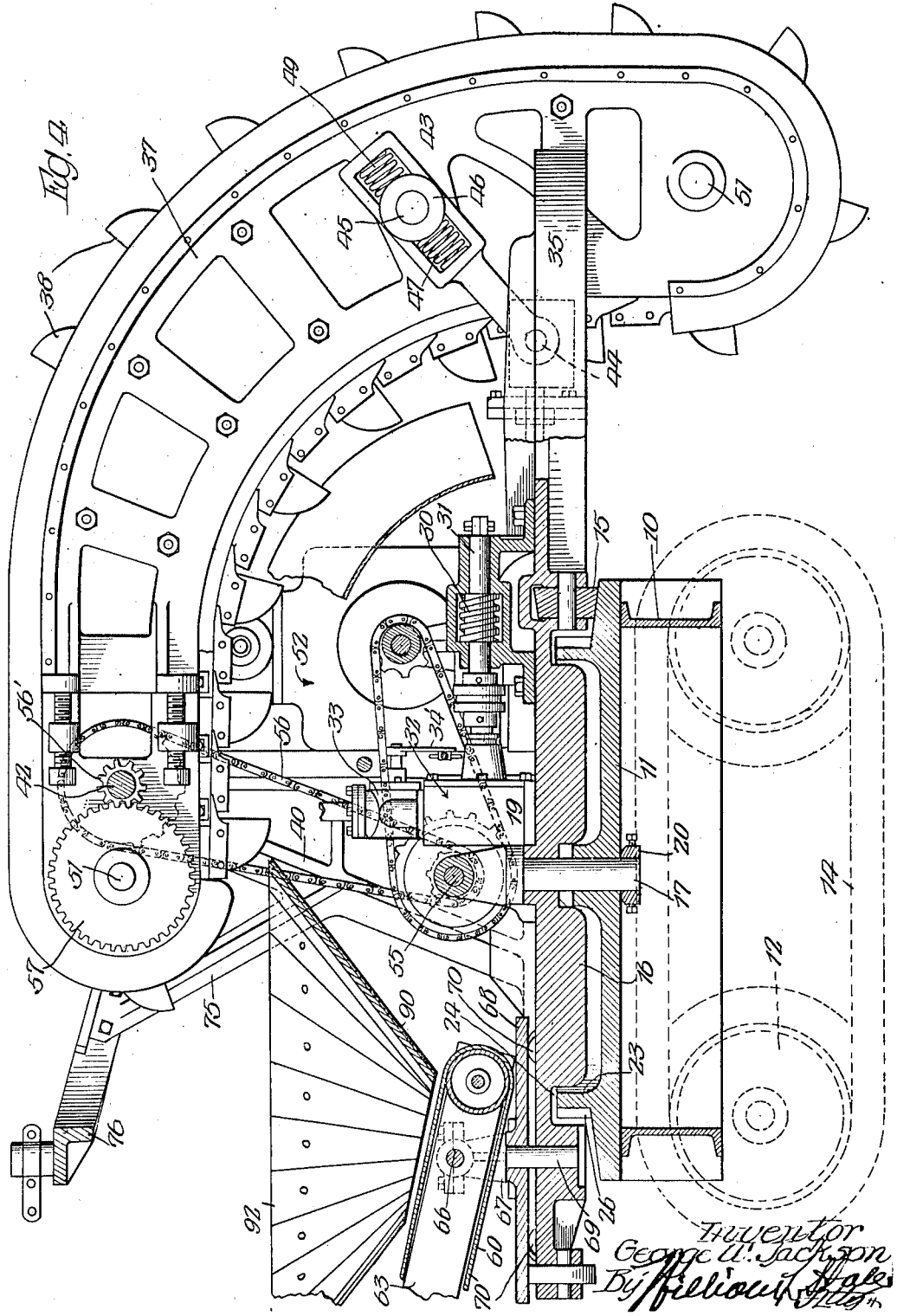

UNITED STATES PATENT OFFICE.

GEORGE W. JACKSON, OF CHICAGO, ILLINOIS, ASSIGNOR, BY MESNE ASSIGNMENTS, TO AMERICAN POWER SHOVEL COMPANY, OF MILWAUKEE, WISCONSIN, A CORPORATION OF WISCONSIN.

LOADING-MACHINE.

1,313,695.  Specification of Letters Patent.  Patented Aug. 19, 1919.

Application filed July 26, 1918. Serial No. 246,839.

*To all whom it may concern:*

Be it known that I, GEORGE W. JACKSON, a citizen of the United States, and a resident of Chicago, in the county of Cook and State of Illinois, have invented certain new and useful Improvements in Loading-Machines; and I do hereby declare that the following is a full, clear, and exact description thereof, reference being had to the accompanying drawings, and to the characters of reference marked thereon, which form a part of this specification.

This invention relates to improvements in means for handling loose material, sometimes known as loading machines, constructed to pick up material from one point and carry it backwardly by a series of traveling pick-up and conveying devices to the point where the material is to be deposited or loaded on a transporting vehicle. The machine herein shown is an improvement on the type of loading machine illustrated in an application for United States Letters Patent filed by me on the twenty-ninth day of May, 1916, Serial Number 100,548.

The present improvements apply to that portion of said loading machine embracing the take-off belt or conveyer frame which is pivotally supported on the turn-table, by which the pick-up device supporting boom is sustained, on an axis eccentric to the axis of rotation of the turn-table whereby the receiving end of the take-off belt frame is maintained at all times in proper relation to the discharge end of the boom regardless of the lateral adjustment of the boom and of the take-off belt frame and whereby the position of the discharge end of the take-off belt is not disturbed when the boom is swung from side to side.

The invention consists in the combination and arrangement of the parts shown in the drawings and described in the specification, and is pointed out in the appended claims.

As shown in the drawings,

Fig. 2 is a plan view thereof showing in dotted lines the parts in different positions of adjustment.

Fig. 3 is a partial plan and partial section thereof.

Fig. 4 is a partial elevation and partial vertical section, the section being taken on the general line indicated at 4—4 on Fig. 3.

Figure 1:
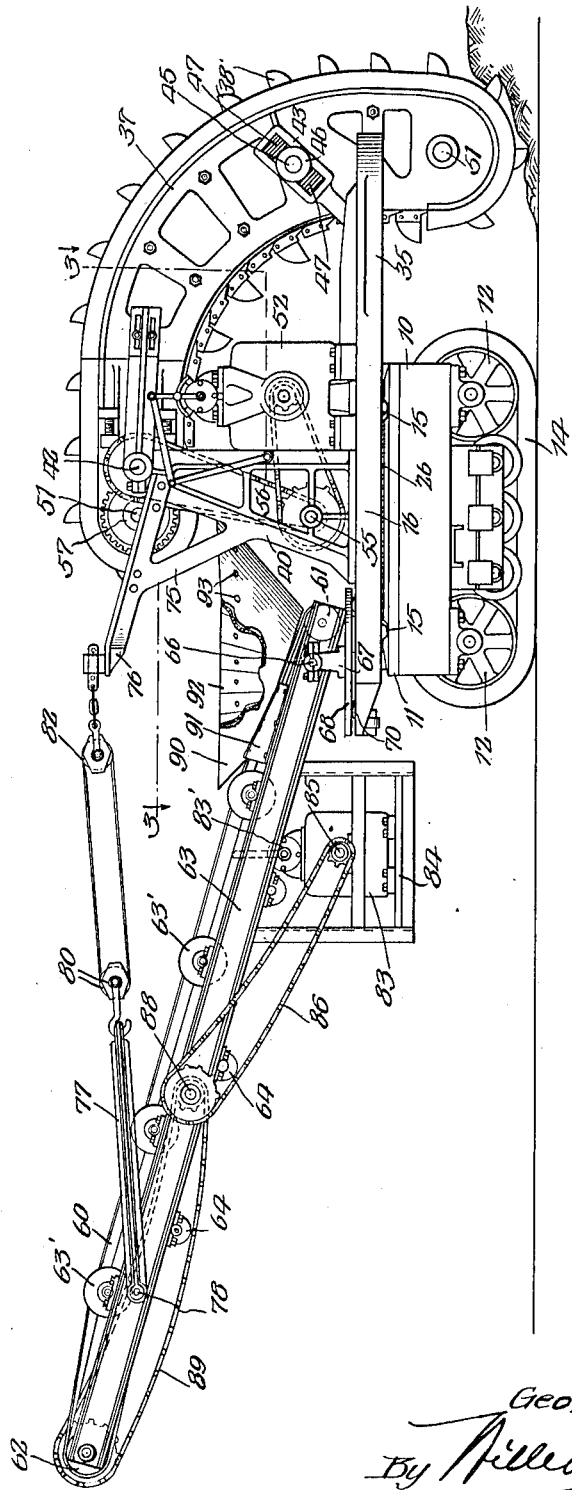
Figure 1 is a side elevation of a machine embodying my invention.

As shown in the drawings, the machine is supported on a carriage 10 comprising, as herein shown, longitudinal and transverse channel bars which are surmounted by a cast metal bed plate 11, all suitably secured together to provide a rigid structure. The carriage is supported on and connected by a caterpillar drive embracing toothed wheels 12 mounted on shafts carried by the carriage, and an endless series of articulated tread sections 14 trained about the pulleys. The construction of the caterpillar drive, as herein shown, is like that illustrated in my prior application for United States Patent, Serial Number 223,058, filed March 18, 1918.

Supported on said carriage through the medium of an annular series of conical antifriction rollers 15, that travel on a tapered, annular track of the bed plate, is a turn-table 16, preferably made of cast metal. It rotates about an axis consisting, as herein shown, of a vertical shaft 17 that is seated in and extends upwardly beyond a boss 18 on the bed plate. Said shaft extends centrally through the bed plate and is headed at its upper end to bear on a raised boss 19 thereof, and is provided at its lower end with a detachable washer 20 by which the shaft is fastened in place. The bed plate is provided radially inside the roller track with an upstanding flange 23 which extends into an annular, downwardly opening recess 24 that is radially within the annular series of rollers 15. The flange is provided with an external curved series of teeth 26 constituting a toothed rack, which is adapted to be engaged by a pinion 27 carried by the lower end of a shaft 28 that is rotatably mounted in a suitable bearing on the turn-table. To the upper end of said shaft is attached an incased worm wheel 29 that lies in a horizontal plane over the turn-table, and said worm wheel meshes with an incased worm 30 which is fixed on a shaft 31, which may be the power shaft of any suitable form of motor 32 that is fixedly supported on the turntable. Said motor may be an air engine, a steam engine, or an electric motor, depending upon the most available motive agent at the point of use of the machine. The valves 33 of the motor 32 are controlled by controller rods 34 that are connected at their inner ends to the controlling lever 34′ of the valves and extend toward both sides of the machine near the controlling devices for the valves of the bucket operating motor 52 hereinafter mentioned. An advantage derived by forming the annular rack 26 on the carriage and recessing the underside of the turn-table to receive the same is that the structure is thereby rendered vertically compact and the turn-table is supported with a minimum likelihood of vibration.

The turn-table is provided at the forward end of the machine with forwardly directed, laterally spaced, arms 35 which are made integral with the turn-table, as shown. Supported on the turn-table in rear of said arms is a super-structure which coöperates with said arms 35, to support the boom 37 on which are mounted to travel an endless series of buckets or pick-up devices 38. Said super-structure comprises, as herein shown, laterally spaced standards 40 which are arranged abreast the turn-table shaft 17, and the bases of which are securely bolted to the turn-table. The upper ends of the standards are formed to provide bearings for a shaft 42 on which the boom is pivoted near its rear end. The boom is supported near its front end from the arms 35 through the medium of buffer yokes 43 that are pivotally supported at 44 on the arms 35. A shaft 45 extends transversely through the boom and is mounted in suitable bearings thereon. The ends of said shaft 45 are mounted in bearings 46 which are slidable in the yoke, and buffer springs 47, 47 are interposed between said end bearings of the shafts and the ends of the yokes to effect a resilient or cushioning connection between the yoke and boom shaft.

The endless series of buckets 38 are trained about pulleys which are mounted on shafts 50, 51 at the forward and rear ends, respectively, of the boom, and said series of buckets are driven by two motors 52 supported on the turntable at opposite sides thereof. Said motors are connected by sprocket wheel and chain drives to the sections of a divided shaft 55 mounted in bearings which rise from the turn-table, and the sections of said divided shaft are in turn separately connected by sprocket belts 56 to said pivot shaft 42 of the boom. Driving power is communicated from said pivot shaft through pinions 56' thereon and gear wheels 57 that are fixed to the upper or rear pulley shaft 51 for the endless series of buckets.

The construction of the boom and means for driving the endless series of buckets constitute in themselves no part of the present invention, but are the subject matter of claims constituting part of an application filed by me on the twenty-second day of April, 1908, Serial Number 230,029.

The material is discharged from the buckets at the rear end of the boom upon a take-off belt 60. Said belt is trained about rollers 61, 62 at the front and rear ends, respectively, of a take-off belt frame designated as a whole by 63. Said take-off belt frame comprises parallel side plates which are suitably connected transversely. In addition to the belt supporting and driving rollers 61, 62 said frame is provided between its ends with numerous transverse rollers 63' arranged to support the upper lap of the plate, and other rollers 64 arranged to support the lower lap thereof. Preferably the said intermediate supporting rollers 63' for the upper lap of the belt are longitudinally concave so as to give a concave shape to the belt to prevent the material from falling off the sides thereof.

The take-off belt frame is pivoted to swing vertically on a shaft 66 that is mounted at its ends in short standards 67. Said standards 67 are mounted on the opposite sides of a disk 68 which constitutes a turn-table that is located over the rear portion of the main turn-table. Said disk rotates about a vertical shaft 69 that is seated in the main turntable and it extends centrally through and has bearing in the smaller turn-table disk 68. The smaller turn-table is supported from the main turn-table through the medium of anti-friction rollers 70.

The rear end of the turntable frame is supported from the super-structure which carries the pivot for the rear end of the boom by means made as follows:

The standards 40 are provided with rearwardly extending braces 75 which support a generally horizontal, arched frame bar 76 that is attached also to the upper ends of the standards 40. 77 designates a bale, the ends of which are connected at 78 to the take-off belt frame at a point near the rear end of the latter. Loosely connected to said bale suitably braced to the take-off belt frame at its closed portion is a sheave or pulley 80 which is connected by a chain, cable, or rope 81 to a pulley or sheave 82 that is loosely connected to the arched frame bar 76. This connection is such that the cable or strand may be shortened or lengthened as necessary to adjust the vertical position of the take-off belt frame, which latter is pivoted to the supporting turn-table, as before described.

One of the rollers 61, 62 is positively driven (the rear roller as herein shown) through the medium of a motor 83 that is supported on a frame 84 which is suspended from and is attached to the frame of the take-off device. The shaft 85 of said motor, or a shaft geared to 66, as desired, extends transversely across, and has bearing in, the frame, and a pinion on the free end of said shaft 85 is connected by a sprocket belt 86 with a sprocket wheel carried on a second transverse shaft 88 that extends through and has bearing in the take-off belt frame. The other end of said shaft 88 carries a sprocket pinion which is connected by a sprocket belt 89 or other suitable drive to a sprocket wheel carried on one end of the shaft of the belt driving and supporting roller 62.

A hopper 90 is located over the receiving end of the take-off belt, and beneath the discharge end of the boom, to direct to the belt the material discharged from the buckets. Said hopper 90 is generally circular in shape and is open at its bottom, rearwardly from its central portion, and also open at its rear portion. It is supported on the side members of the take-off belt frame by means of supporting plates 91 rigidly fixed to the hopper at the sides of its rear opening and fixed in any suitable manner to said members.

Preferably the hopper is provided with a sectional liner 92 of a shape and having openings to correspond to that of the hopper. Said liner is removably attached to the hopper by means of bolts 93, or like readily removable fastening devices. The purpose of providing said liner is to enable the hopper structure to be readily repaired upon the occasion of wearing away of the wall thereof by contact therewith of the material being handled. Such wear will be taken by the liner and the work of removing the liner is simple as compared to the work of removing the entire hopper structure.

From an inspection of Fig. 2 of the drawings, it will be apparent the boom and take-off device frame are capable of wide ranges of relative movement in use. The bucket carrying boom may be swung almost through 180 degrees, and the take-off belt frame is capable of substantially the same range of adjustment. The take-off belt frame is free to be swung from side to side, relatively to the main turn-table and the boom, to deliver material to any point within its range of movement, and is also automatically adjusted with respect to the relation of its receiving end to the discharge end of the boom when the turn-table is angularly adjusted about its axis to swing the receiving end of the boom from side to side.

The manner of furnishing power to and connecting it with the driving roller of the take-off belt is simple and efficient, inasmuch as it avoids what would amount to a difficult connection of transmission of power thereto from a motor on the turntable. The controlling valve 83' for the motor 83 may be connected to a valve gear by which to operate said valve from a point adjacent to the other controls, such as is set forth in my aforesaid application Serial Number 230,029. Ordinarily, however, such control is not required inasmuch as the motor 85 for the take-off belt will be in more or less continuous operation during the use of the machine.

The construction by which power is delivered from the motor 32 to the turn-table to turn the latter is simple and rugged and is efficient inasmuch as the power is transmitted directly to the gear teeth of the flange 23.

It will be noted that the suspension of the take-off belt frame is one which, while suspending the said frame from above, does not rise beyond the over all height of the machine, so that the machine as designed is capable of working in tunnels, mines, or like places, where the roof or ceiling clearance is low. Moreover, the suspension of the take-off belt frame in the manner shown simplifies the construction and permits the use of as long a take-off belt as necessary and also permits the take-off belt frame to be adjusted in vertical adjustment as well as laterally.

I claim as my invention:

1. In a loading machine, the combination of a boom supporting superstructure supported on a turn-table, a turn-table, a boom pivoted to the superstructure and carrying an endless series of pick-up devices, a take-off belt frame connected to the turn-table by a vertical pivot eccentric to the axis of the turn-table and pivoted also to swing vertically, and means not higher than the discharge end of the boom for supporting the free end of the take-off belt frame, substantially as shown.

2. In a loading machine, the combination of a take-off belt frame, a turntable, standards rising from the turntable, a boom pivotally mounted near its rear end on said standards, means to support the forward end of the boom from the turn-table, an endless series of pick-up devices carried by the boom, a vertical pivot eccentric to the turning axis of the turntable connecting the take-off belt frame to the turntable, the receiving end of said frame being below the discharge end of the boom, a frame extension on the aforesaid standards below the topmost part of the pick-up devices, and means for supporting the free end of the take-off belt frame from said extension, substantially as shown.

3. A loading machine comprising a carriage provided with an annular upstanding toothed rack and radially exterior with an annular bearing roller track, a turn-table mounted to rotate on the carriage and formed with a downwardly opening annular recess to receive said rack and provided radially exterior therewith an annular series of rollers to engage said track, a pinion rotatively mounted on the turn-table and meshing with said rack, with means to drive it, standards rising from a turn-table, a boom pivotally mounted near its rear end on said standards, an endless series of pick-up devices carried by the boom, means to support the forward end of the boom from the turn-table, a take-off belt frame connected to the turn-table by a vertical pivot eccentric to the turning axis of the turn-table, with its receiving end beneath the discharge end of the boom, a frame extension on said standards below the topmost part of the pick-up structure, a bale connected to the take-off belt near its rear end, and a block and tackle connection between said bale and said frame extension.

4. In a loading machine, the combination of a carriage, a turntable mounted to rotate on the carriage, a boom, a take-off belt frame located with its lower end above the turn-table and beneath the discharge end of the boom, a small turntable mounted on the aforesaid main turntable, a pivot for mounting the small turntable eccentric to the turning axis of the main turntable, means to support the receiving end of the take-off frame from the small turntable, and means to support the rear end of the take-off belt frame, and boom supporting standards from which the take-off belt frame is supported, substantially as and for the purposes described.

5. A machine for the purpose set forth comprising a carriage, a turn-table mounted to rotate thereon, a boom supported on said turn-table and projecting forwardly therefrom, an endless series of traveling pick-up devices carried by the boom, a take-off belt frame arranged with its forward end beneath the discharge end of the boom, a small turn-table rotatively mounted on the main turn-table about an axis eccentric to the turning axis of the main turn-table, and means for supporting the forward end of said frame on the small turn-table, said small turn-table being free to rotate independently of the main turn-table.

6. A machine for the purpose set forth comprising a carriage, a turn-table mounted to rotate thereon, a boom supported on said turn-table and projecting forwardly therefrom, an endless series of traveling pick-up devices carried by the boom, a take-off belt frame arranged with its forward end beneath the discharge end of the boom, a small turn-table rotatively mounted on the main turn-table about an axis eccentric to the turning axis of the main turn-table, standards rising from said small turn-table, a horizontal pivot to connect the forward end of said frame to said standards whereby said frame may be adjusted vertically, and means for supporting the rear or free end of said frame.

7. A machine for the purpose set forth comprising a carriage, a turn-table mounted to rotate thereon, a boom supported on said turn-table and projecting forwardly therefrom, an endless series of traveling pick-up devices carried by the boom, a take-off belt frame arranged with its forward end beneath the discharge end of the boom, a small turn-table rotatively mounted on the main turn-table about an axis eccentric to the turning axis of the main turn-table, standards rising from the main turntable, a horizontal pivot to connect the forward end of said frame to said standards whereby said frame may be adjusted vertically, and means for supporting the rear or free end of said frame, said small turn-table being freely rotatable on its axis independently of the movement of the main turn-table.

8. A machine for the purpose set forth comprising a carriage, a turn-table mounted to rotate thereon, a boom supported on the turn-table and projecting forwardly therefrom, an endless series of pick-up devices carried by the boom, a take-off belt frame pivoted to the turn-table on an axis eccentric to the turning movement of the turn-table, with its receiving end below the discharge end of the boom, rollers mounted in said frame, an endless take-off belt trained to said rollers, a motor supported on said frame, a shaft driven by said motor extending transversely across the frame, an intermediate shaft extending also across the frame and rotatively mounted therein, driving connections between said shafts at one side of said frame, and a second driving connection between the intermediate shaft and one of the shafts of the belt supporting roller at the other side of said frame.

In testimony whereof I claim the foregoing as my invention I hereunto append my signature at Chicago, Illinois, this 23rd day of July, 1918.

GEORGE W. JACKSON.